(12) United States Patent
Chung

(10) Patent No.: US 7,130,126 B1
(45) Date of Patent: Oct. 31, 2006

(54) THREE-DIMENSIONAL PLASTIC SHEET

(75) Inventor: Hyunin Chung, Seoul (KR)

(73) Assignee: Mirceo Korea Co., Ltd. (KR)

( * ) Notice: Subject to any disclaimer, the term of this patent is extended or adjusted under 35 U.S.C. 154(b) by 0 days.

(21) Appl. No.: 11/376,975

(22) Filed: Mar. 16, 2006

(51) Int. Cl.
G02B 27/10 (2006.01)
G03B 21/60 (2006.01)
B32B 3/00 (2006.01)

(52) U.S. Cl. ............ 359/619; 359/620; 359/626; 359/455

(58) Field of Classification Search ........... 359/619, 359/620, 626, 454, 455, 463, 599, 707, 798; 428/172, 163
See application file for complete search history.

(56) References Cited

U.S. PATENT DOCUMENTS 5,753,344 A * 5/1998 Jacobsen ............ 428/142
6,751,024 B1 * 6/2004 Rosenthal ............ 359/626
2004/0263971 A1 * 12/2004 Lipton et al. ........ 359/463

* cited by examiner

Primary Examiner—Loha Ben
Assistant Examiner—Jack Dinh
(74) Attorney, Agent, or Firm—Cantor Colburn LLP

(57) ABSTRACT

The present invention relates to a three-dimensional plastic sheet that forms an array of convex lenses having a plurality of semispherical convex lenses arranged horizontally and vertically on the surface thereof, such that a three-dimensional image can be vividly seen even at every positions irrespective of the position or direction of the plastic sheet, while greatly minimizing the generation of moire patterns caused by the interference of different color dots. The three-dimensional plastic sheet includes: a convex lens layer formed of a transparent synthetic resin and having an array of identical semi-spherical convex lenses formed on the top surface thereof; a transparent plate disposed at the bottom surface of the convex lens layer and formed of a synthetic resin plate having a thickness corresponding to a focal distance of each convex lens; a non-focal distance printed layer disposed on the top surface of the transparent plate by means of offset printing for providing a real picture screen thereon; and a focal distance printed layer disposed on the bottom surface of the transparent plate by means of the offset printing for providing a three-dimensional screen thereon through four-color dot printing computed and image-segmented by a computer graphic process.

4 Claims, 8 Drawing Sheets

THREE-DIMENSIONAL PLASTIC SHEET

BACKGROUND OF THE INVENTION

1. Field of the Invention

The present invention relates to a three-dimensional plastic sheet that can be produced in great quantities by means of offset printing, and more particularly, to a three-dimensional plastic sheet that has an array of identical semispherical convex lenses formed on the top surface thereof, such that a three-dimensional image can be vividly seen even at every positions irrespective of the position or direction of the plastic sheet, while greatly minimizing the generation of moire patterns caused by the interference of different color dots.

2. Background of the Related Art

Generally, a three-dimensional plastic sheet is formed of a lenticular screen that has an array of semi-cylindrical lenses each having a pitch of about 0.5 mm formed on the top surface of the sheet. In case of a three-dimensional photographic printing, the images of an object seen by left and right eyes are each printed on a sheet of lenticular screen, thereby obtaining a three-dimensional image where the object looks like floating in the space or going away into the space when seen through the two eyes.

In this case, the lenticular screen that has the plurality of semi-cylindrical lenses serially arranged on the top surface of the plastic sheet gives the three-dimensional effect just to the left and right sides with respect to the length direction of each lens, but does not give any three-dimensional effect to the upper and lower sides thereof, such that there is a defect in that the viewing angle for the three-dimensional image is limited.

On the other hand, a conventional three-dimensional plastic sheet is formed in such a fashion that a printed surface seen through a lens layer having an array of lenses formed thereon is recognized thus to observe a designed three-dimensional image, wherein the printed surface is processed by means of general offset printing, for production in great quantities. At this time, there occurs a problem that since the conventional plastic sheet does not have any high resolution due to the embossing effect of the lenses seen through the lens layer, the printed screen cannot be vivid and clear.

On a general offset printing screen, moreover, numerous dots constituting the printed screen are refracted on the lens layer to cause the generation of moire patterns or dizzy illusion due to the interference of the dots, such that more vivid three-dimensional screen cannot be provided.

With the conventional three-dimensional plastic sheet processed by means of the offset printing, therefore, a simple pattern of three-dimensional image should be displayed through one-color printing, which makes it difficult to display a three-dimensional effect through four-primary color printing or special effects (for example, two-way transformation, motion, and morph effects) in a lenticular technique.

In some cases, of course, there has been presented a three-dimensional method using IP (integral photography) technique as introduced by M. G. Lippmann in France, 1908, which is not practical in use because of requiring a high precision of machining technique and a high resolution of photography technique.

SUMMARY OF THE INVENTION

Accordingly, the present invention has been made in view of the above-mentioned problems occurring in the prior art, and it is an object of the present invention to provide a three-dimensional plastic sheet that forms an array of convex lenses having a plurality of semispherical convex lenses arranged horizontally and vertically on the surface thereof, such that a three-dimensional image can be vividly seen even at every positions irrespective of the position or direction of the plastic sheet, that adopts an integral photography three-dimensional method as one of conventional techniques to conduct reverse tracking of the conventional photographing method to reconstitute the photographed image as a computer graphic screen, and that is applied to the offset printing through digital output, while obtaining the special effects both in the integral photography technique and in a lenticular technique, thereby greatly minimizing the generation of moire patterns commonly caused in the offset printing to provide more vivid three-dimensional image and thereby being made in great large quantities.

To accomplish the above object of the present invention, according to the present invention, there is provided a three-dimensional plastic sheet including: a convex lens layer formed of a transparent synthetic resin and having an array of identical semi-spherical convex lenses formed on the top surface thereof; a transparent plate disposed at the bottom surface of the convex lens layer and formed of a synthetic resin plate having a thickness corresponding to a focal distance of each convex lens; a non-focal distance printed layer disposed on the top surface of the transparent plate by means of offset printing for providing a real picture screen thereon; and a focal distance printed layer disposed on the bottom surface of the transparent plate by means of the offset printing for providing a three-dimensional screen thereon through four-color dot printing computed and image-segmented by a computer graphic process, wherein the convex lens layer is bonded to the transparent plate with the non-focal distance printed layer and the focal distance printed layer disposed at the top and bottom surfaces thereof.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The drawings below show the most desirable example of a structure of the invention. Above all, the reference number of each part is referred as same number in explaining other drawings.

As shown in FIGS. 1 to 4, a convex lens layer 10 is disposed on the uppermost surface of the three-dimensional plastic sheet 1.

The convex lens layer 10 is formed of a transparent synthetic resin by means of molding in such a manner as to have an array of identical semi-spherical convex lenses 11 formed vertically and horizontally on the top surface thereof.

Figure 9:
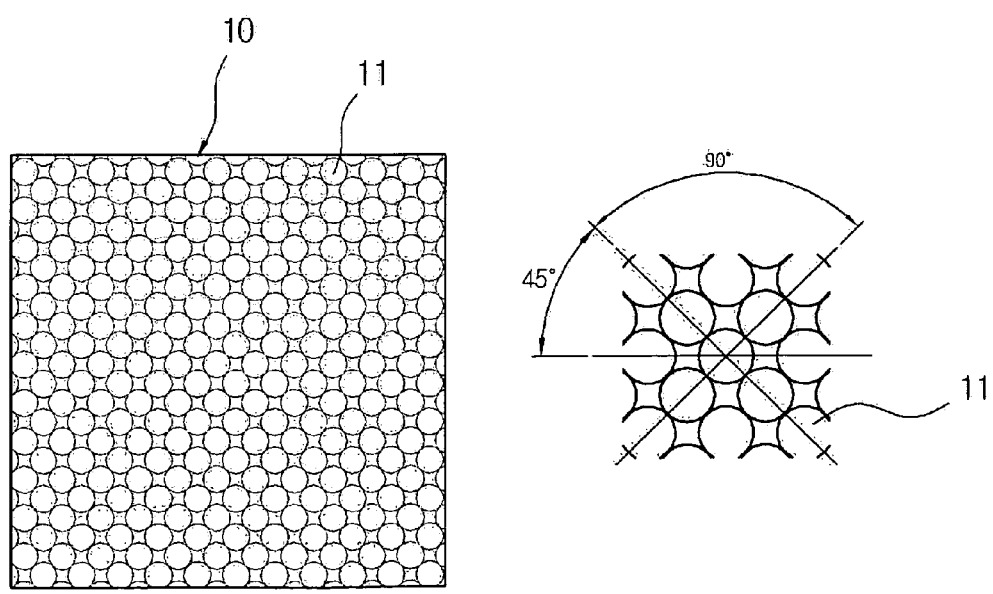
FIG. 9 is a plane view showing the convex lenses are arranged at an inclination of 45° on a convex lens layer adopted in the present invention.

The convex lenses 11 of the convex lens layer 10 are arranged, as shown in FIG. 9, at an inclination of 45°, in such a manner that the imaginary lines passing the centers of the convex lenses 11 have a crossing angle of 90°.

Figure 10:
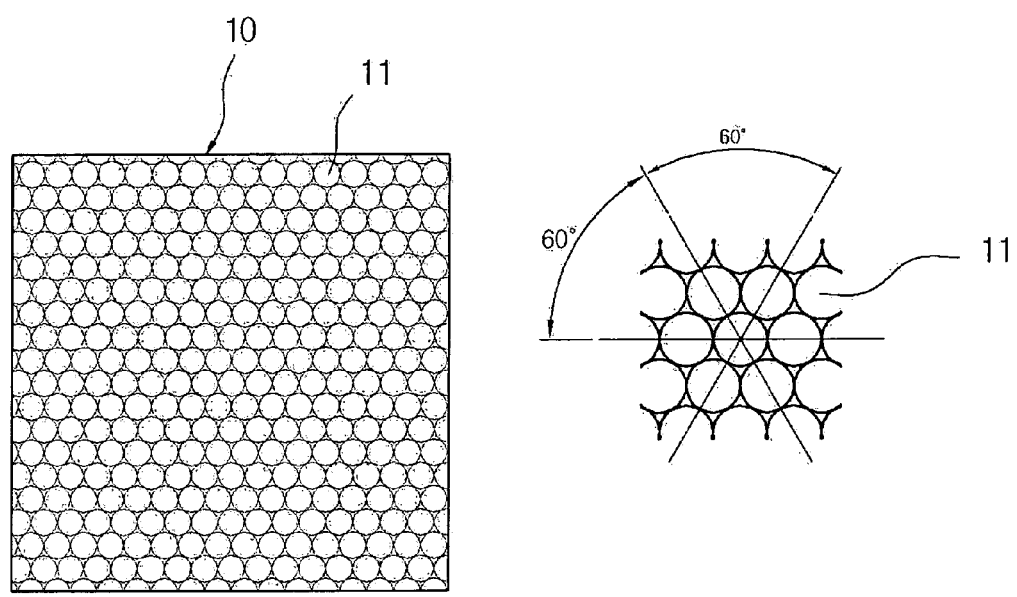
FIG. 10 is a plane view showing the convex lenses are arranged at an inclination of 60° on a convex lens layer adopted in the present invention.

In some cases, the convex lenses 11 are arranged, as shown in FIG. 10, at an inclination of 60°, in such a manner that the imaginary lines passing the centers of the convex lenses 11 have a crossing angle of 60°. In the preferred embodiments of the present invention, however, the convex lenses 11 preferably have an inclination of 45°.

A transparent plate 20, which is formed of a transparent synthetic resin, is disposed on the bottom surface of the convex lens layer 10, and in this case, the transparent plate 20 has the same thickness as a focal distance of each convex lens 11.

A non-focal distance printed layer 31 is disposed on the top surface of the transparent plate 20 by means of offset printing for providing a real picture screen thereon.

The non-focal distance printed layer 31 has a general printed surface that is a part placed on the special effect printed surface of a focal distance printed layer 32 for providing a three-dimensional screen thereon as will be discussed. The general printed surface is displayed with subject pictures, product photographs, various patterns, and so on.

At this time, the special effect printed surface of the focal distance printed layer 32 is used for displaying the three-dimensional effect or the special effect of the pattern formed continuously from the top to the bottom thereof and from the left to the right thereof.

As a result, the differences of depth senses and the visual differences of special effects can be recognized between the special effect printed surface (having a non-three-dimensional effect, a three-dimensional effect, a motion effect, a transformation effect, and the like) of the focal distance printed layer 32 and the general printed surface of the non-focal distance printed layer 31.

The focal distance printed layer 32 is disposed on the bottom surface of the transparent plate 20 by means of the offset printing for providing the three-dimensional screen through four-color dot printing computed and image-segmented by a computer graphic process, such that the three-dimensional screen can be seen through the convex lens layer 10.

Figure 7:
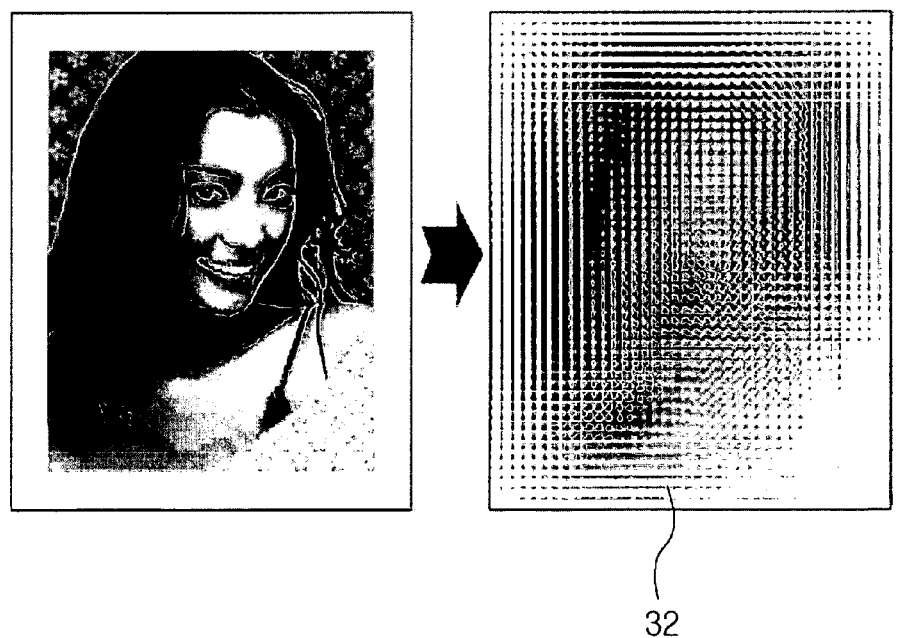
FIG. 7 is a view showing the image of the special effect printed surface on a focal distance printed layer is separated through a computer graphic process.
Figure 8:
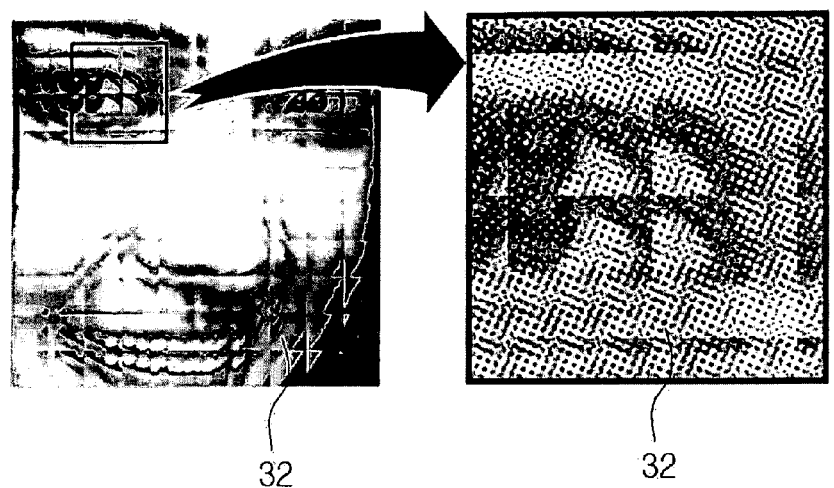
FIG. 8 is an enlarged view showing a part of FIG. 7, wherein the structure of dots by means of offset printing is enlarged.

The focal distance printed layer 32 is formed by means of the four-color dot printing having the same intervals and arrangements as the convex lenses 11, and as shown in FIGS. 7 and 8, it is made through the image segmentation in the computer graphic process. The image-segmentation is made in such a manner as to conduct the image-segmentation for the left and right lenticular screen and for the upper and lower lenticular screen at the same time, thereby providing the printed screen.

The convex lens layer 10 is bonded to the transparent layer 20 with the printed layers 31 and 32 disposed thereon by means of laminating or adhesive.

Under the above construction of the three-dimensional plastic sheet 1, according to the present invention, the images between the general printed surface of the non-focal distance printed layer 31 and the special effect printed surface of the focal distance printed layer 32 are seen as a more vivid printed screen where moire patterns causing dizzy illusion do not occur thereon. Further, the general printed surface of the non-focal distance printed layer 31 and the special effect printed surface of the focal distance printed layer 32 provide the differences of depth senses or special effects therebetween, thereby achieving a high quality of special image.

On the other hand, the screen of the focal distance printed layer 32 is in a range displaying three-dimensional effects, special effects, or general background effects, using real pictures, figures, patterns, and so on. Also, moire patterns and a rough printed state that may be generally generated on the three-dimensional plastic sheet 1 should be removed on the screen of the focal distance printed layer 32.

However, if the focal distance printed layer 32 is made by means of general offset printing, it is difficult to have a vivid offset printed screen. This is because the three-dimensional sheet forms the three-dimensional effect by the refraction of light transmitted through the convex lenses 11 and by the binocular disparity of human being. That is to say, the convex lenses 11 constituting the convex lens layer 10 serve to refract numerous dots on the focal distance printed layer 32 printed by means of the offset printing, which results in the generation of dizzy illusion on the printed screen.

Figure 11:
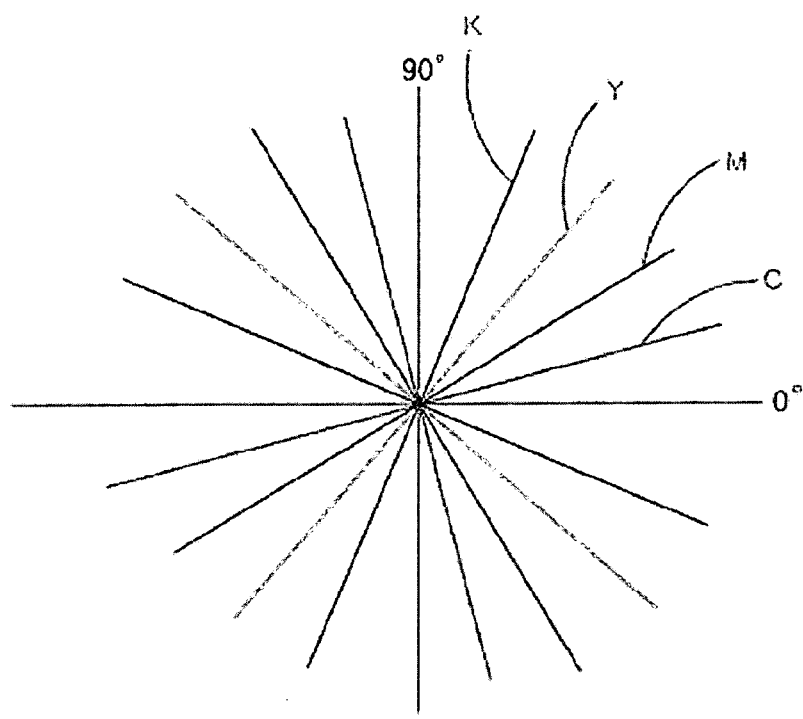
FIG. 11 is a view showing the inclination angles of the four-color dots processed by means of the offset printing.
Figure 11:
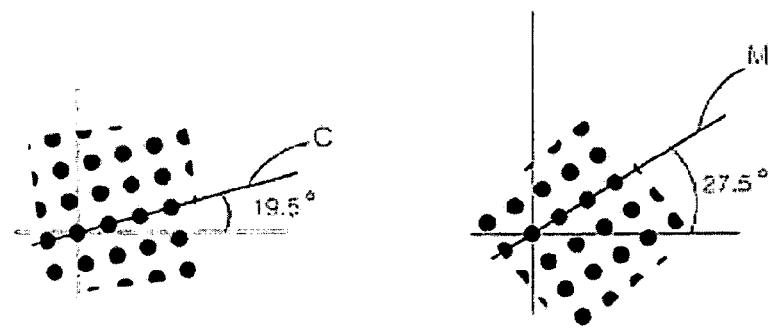
Figure 11:
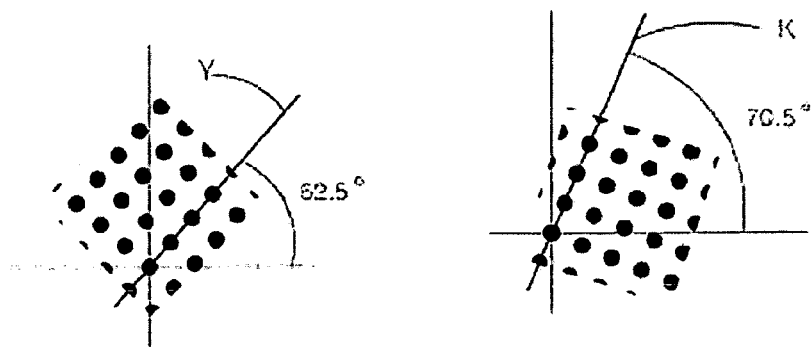

Therefore, as shown in FIG. 11, the angles of printed dots are set in such a manner as to be greatly different from the arrangement angles of semispherical convex lenses 11 for having greatly different angles from one another, which preferably causes the generation of moire patterns to be substantially suppressed.

The primary color printing of the focal distance printed layer 32 is made with four primary colors of C (cyan), M (magenta), Y (yellow), and K (black), and the printed dots constituting the offset printing should have high resolution (lpi).

That is, as appreciated from Table 1, the angles of dots may be varied in accordance with the density of arrangement of the convex lenses 11. For example, if the density of the convex lenses 11 is 80 lpi (which means the number of lines crossing vertically and horizontally within an area of 1 inch), if the inclination with respect to a horizontal line is 45°, and if the density of dots is 400 lpi, the angles of dots where the moire pattern or dizzy illusion is hardly generated are about 19.5°, 27.5°, 62.5°and 70.5°. Since the angles of convex lenses 11 crossing with the dots are 90°, they are identical to about 109.5°, 117.5°, 152.5°, and 160.5°.

Since the general offset printing is conducted with resolution of 175 lpi, the three-dimensional plastic sheet 1 of this invention has better effects as the resolution becomes higher, that is, the lpi reaches 200, 300, and 400.

The angles of offset dots enabling the generation of the moire patterns to be minimized are varied, as shown in Table 1, in accordance with the degrees of resolution, and the four-color (C,M,Y,K) dots select any one of the angles listed below at the respective degrees of resolution in such a manner as to have different angles from one another, thereby establishing their respective inclinations.

TABLE 1

| Density of printed dots | 174 lpi | 200 lpi | 300 lpi | 400 lpi | Remarks |
|---|---|---|---|---|---|
| Convex lens: density of 80 lpi and angle of 45° | 5.6° | 5.6° | 2.8° | 19.5° | Angles of offset dots enabling moire pattern to be minimized |
| | 8.4° | 11.3° | 18.2° | 27.5° | |
| | 28° | 28.5° | 25.3° | 62.5° | |
| | 34° | 39.5° | 33.7° | 70.5° | |
| | 56° | 42° | 40° | | |
| | 62° | 48° | 50° | | |
| | 81.6° | 50.5° | 56.3° | | |
| | 84.4° | 61.5° | 64.7° | | |
| | | 78.7° | 71.8° | | |
| | | 84.4° | 87.2° | | |

Further, the non-focal distance printed layer 31 that is disposed on the top surface of the transparent plate 20 forms the general printed surface, and since the general printed surface that is processed by means of four-color offset printing is positioned within the non-focal distance of the convex lens layer 10, the refraction and distortion of the convex lens become minimized to provide a more vivid screen with subject pictures or figures where moire patterns and rough printed state disappear, thereby protecting the functional effect of the convex lens layer 10.

Since the special effect printed surface of the focal distance printed layer 32 and the general printed surface of the non-focal distance printed layer 31 are disposed at the top and bottom surfaces of the transparent plate 20, the effects that can be seen through the convex lens layer 10 are differently displayed. That is to say, the product pictures or subject pictures printed on the general printed surface look like floating in the space or going away into the space on the background having lots of figures printed on the special printed surface, thereby providing a high quality of three-dimension effect to the three-dimensional plastic sheet of this invention.

Figure 1:
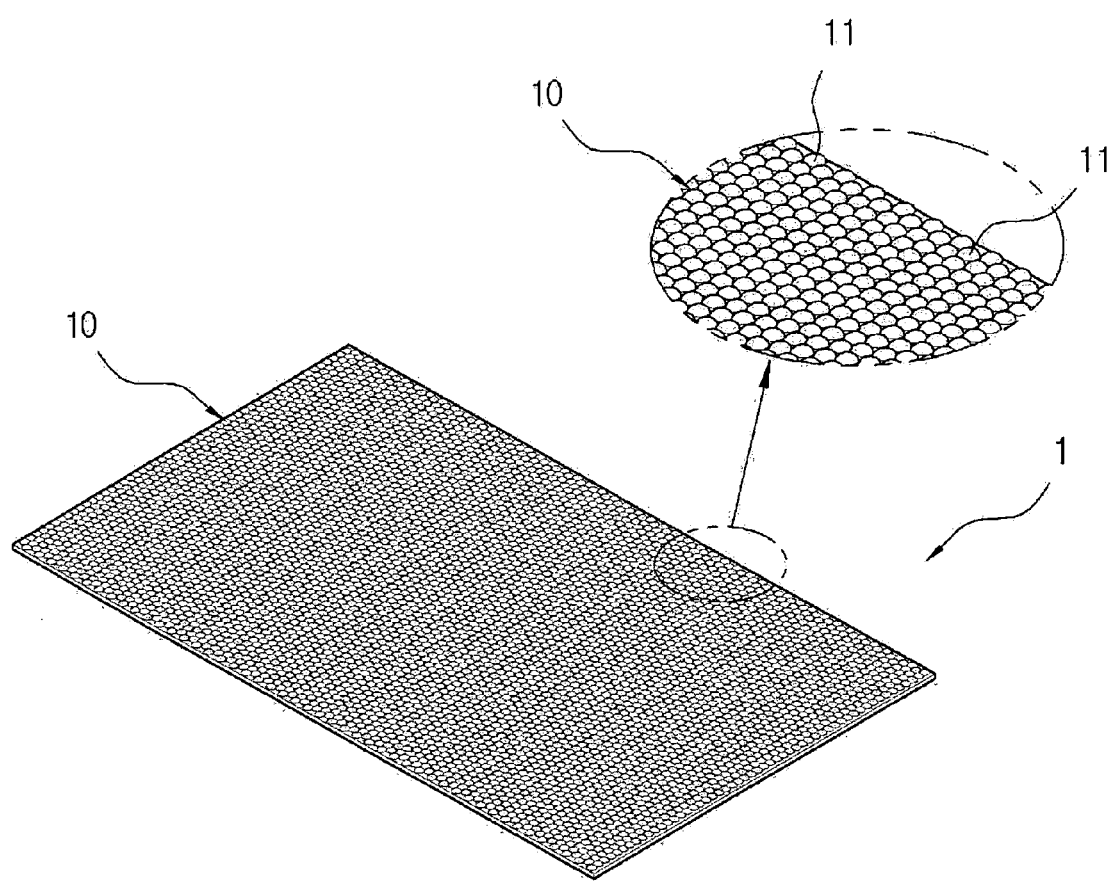
FIG. 1 is a perspective view showing a three-dimensional plastic sheet according to a first embodiment of the present invention.
Figure 2:
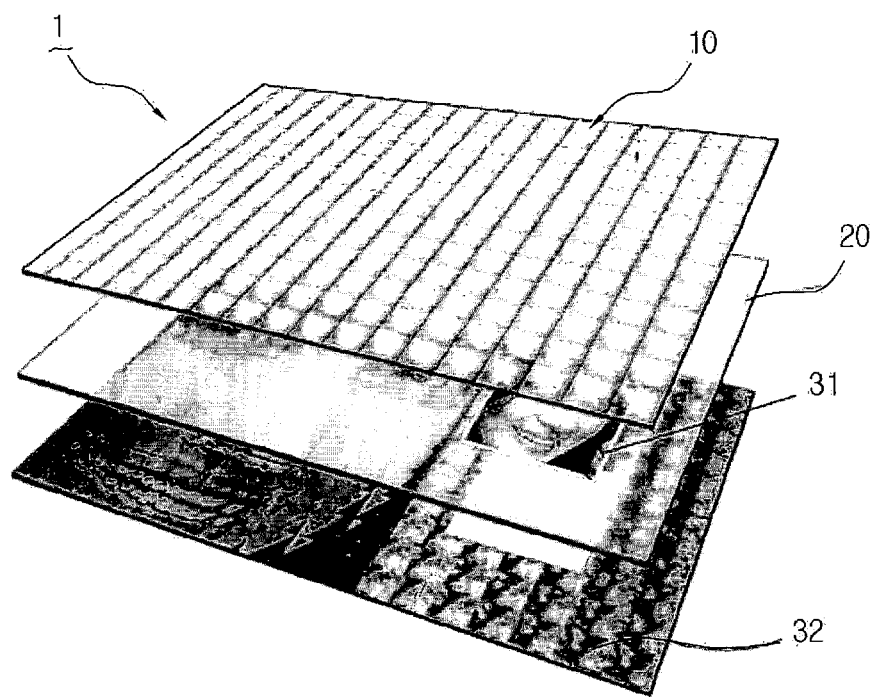
FIG. 2 is an exploded perspective view showing the three-dimensional plastic sheet according to the first embodiment of the present invention.
Figure 3:
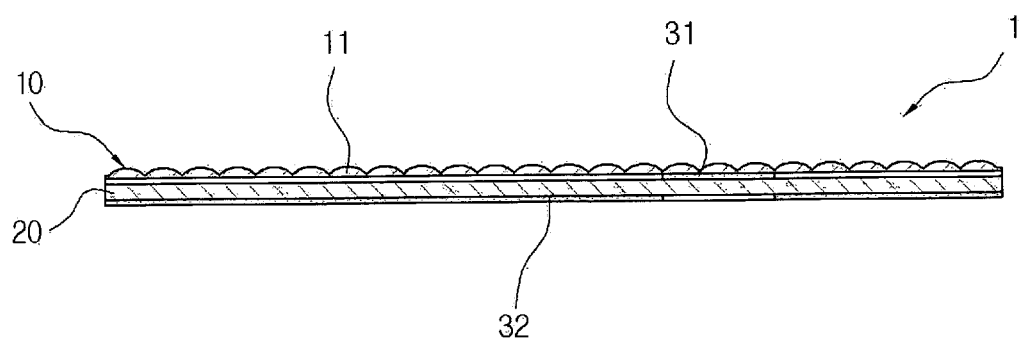
FIG. 3 is a sectional view showing the three-dimensional plastic sheet according to the first embodiment of the present invention.
Figure 4:
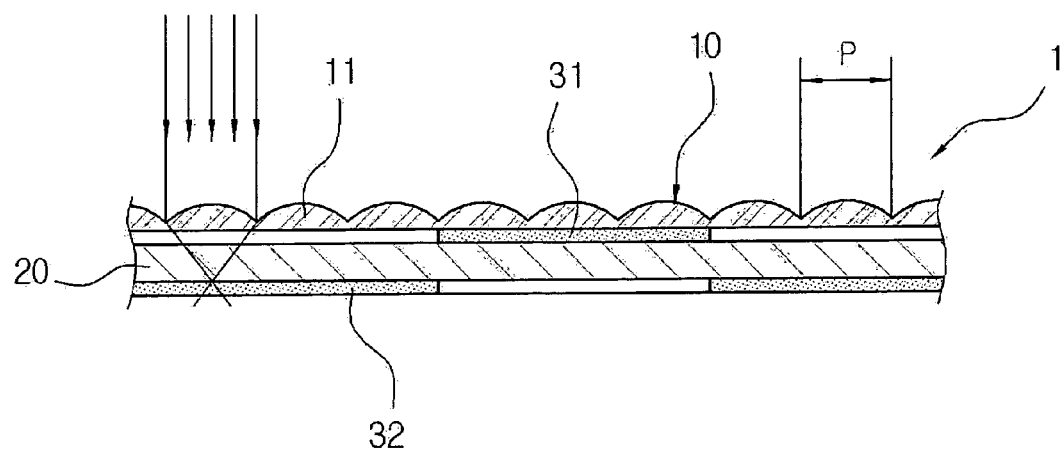
FIG. 4 is a partly enlarged sectional view showing the three-dimensional plastic sheet according to the first embodiment of the present invention.
Figure 5:
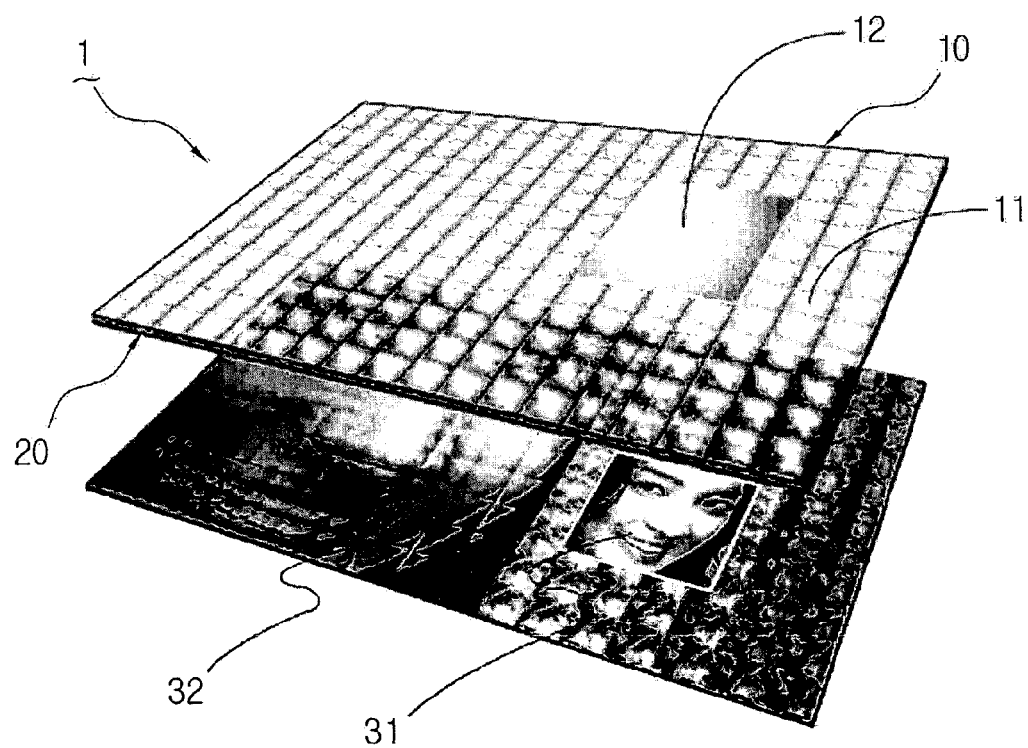
FIG. 5 is an exploded perspective view showing a three-dimensional plastic sheet according to a second embodiment of the present invention.
Figure 6:
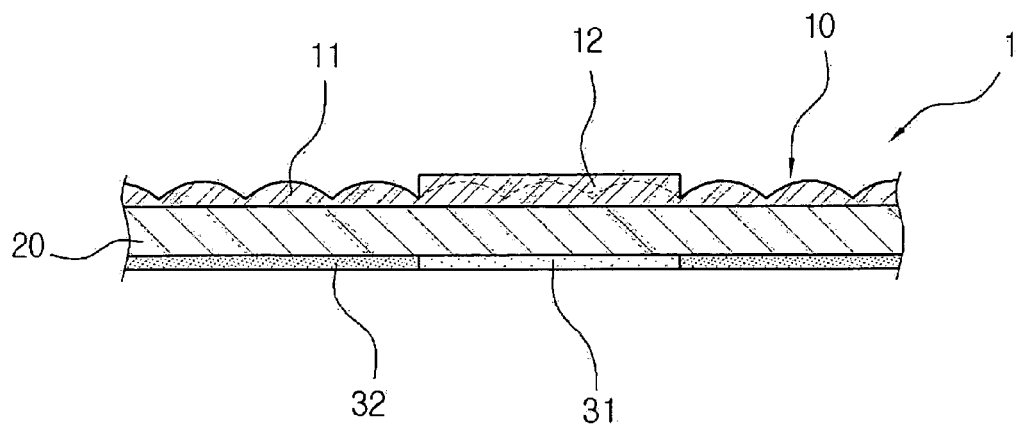
FIG. 6 is a partly enlarged sectional view showing the three-dimensional imaging plastic sheet according to the second embodiment of the present invention.

On the other hand, as shown in FIGS. 5 and 6, a generally flat viewing window 12 is partially formed on the convex lens layer 10, and the non-focal distance printed layer 31 is partially formed on the focal distance printed layer 32 in such a manner as to be disposed just below the viewing window 12.

Of course, the non-focal distance printed layer 31 may be disposed on the top surface of the transparent plate 20. Preferably, however, when the non-focal distance printed layer 31 is formed on the portion of the focal distance printed layer 32, the printing efficiency can be more improved.

The viewing window 12 is made by applying a transparent resin on a portion of the convex lens layer 10 and hardening the applied transparent resin, and in some cases, it may be formed by pressurizing and heating a flat mold. According to the preferred embodiments of the present invention, the methods for making the viewing window 12 may be selected appropriately within the spirit and scope of this invention.

As mentioned above, the formation of the flat viewing window 12 on the convex lens layer 10 gives some advantages in that the printed screen can be more vivid when compared with having the fine texts or figures on the general printed surface of the non-focal distance printed layer 31, a high resolution of printing can be achieved, and the plastic sheet looks like a transparent material.

Even though the general printed surface of the non-focal distance printed layer 31 has high resolution, the formation of the viewing window 12 prevents the resolution of the non-focal distance printed layer 31 from being decreased due to the interference of the convex lenses 11 through the refraction of light and further overcomes the problem that the resolution of the general printed surface is determined just within the density of the convex lenses 11 on the convex lens layer 10.

Figure 12:
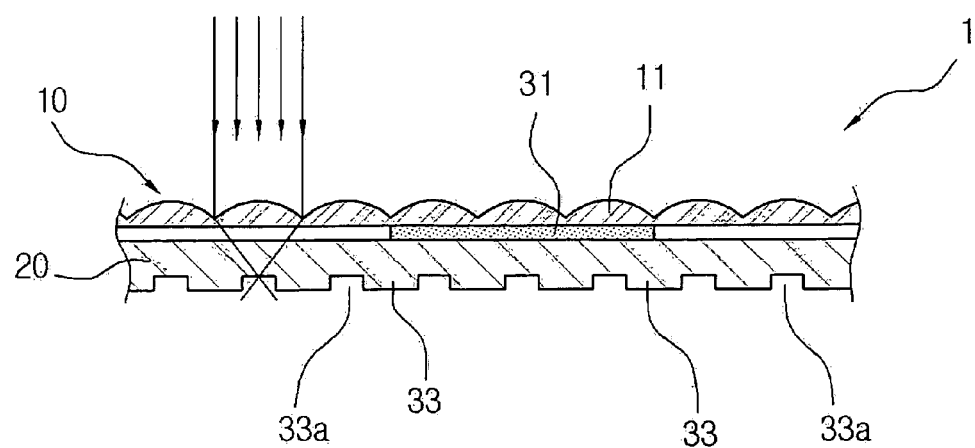
FIG. 12 is a sectional view showing a three-dimensional plastic sheet according to a third embodiment of the present invention.
Figure 13:
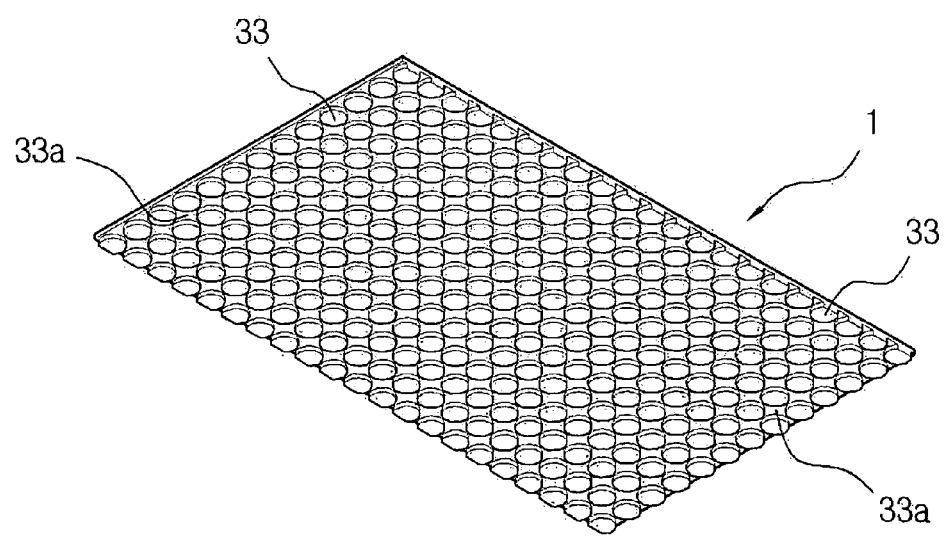
FIG. 13 is a perspective view showing the underside of the three-dimensional plastic sheet according to the third embodiment of the present invention.

On the other hand, as shown in FIGS. 12 and 13, instead of the focal distance printed layer 32, an array of embossing patterns 33 is formed on the bottom surface of the transparent plate 20. A plurality of grooves 33a, which are formed between the respective embossing patterns 33, may be disposed at the focal positions of the respective convex lenses 11.

In this case, a high and vivid three-dimensional effect is obtained in such a fashion that the product or subject pictures on the general printed surface look like floating in the space or going away into the space at a background screen where the three-dimensionally protruded embossing patterns 33 are formed.

The embossing patterns 33 are made by applying a transparent resin on the bottom surface of the transparent plate 20 and hardening the applied transparent resin, and in some cases, it may be formed by pressurizing and heating a mold formed of an array of grooves against the bottom surface of the transparent plate 20. According to the preferred embodiments of the present invention, the methods for making the embossing patterns 33 may be selected appropriately within the spirit and scope of this invention.

While the present invention has been described with reference to the particular illustrative embodiments, it is not to be restricted by the embodiments but only by the appended claims, and therefore, it is to be understood that other modifications and variations may be made without departing from the substance and scope of the present invention, as those skilled in the art will readily understand. Such alternate modifications and variations are within the scope of the present invention which is intended to be limited only by the appended claims and equivalents thereof.

As set forth in the foregoing, according to the three-dimensional plastic card of this invention, when the plastic card 1 is seen through the convex lens layer 10, the product pictures or subject pictures printed on the general printed surface look like floating in the space or going into the space on the background having lots of figures printed on the special printed surface, thereby providing a high quality of three-dimension effect, and since the convex lenses have identical semispherical shape, a three-dimensional image can be vividly seen even at every positions irrespective of the position or direction of the three-dimensional plastic sheet 1.

Additionally, the printed layers 31 and 32 formed on the top and bottom surfaces of the transparent plate 20 are processed by means of offset printing, thereby enabling the plastic card 1 of this invention to be made in great quantities. The focal distance printed layer 32 is also processed by means of four-color dot printing computed and image-segmented by computer graphic process as made by improving the existing integral photography technique. Since the four-color (C,M,Y,K) dots providing high resolution have different optimal inclinations from one another, the generation of moire patterns or dizzy illusion can be greatly suppressed, thereby providing better three-dimensional effect having a high quality of resolution. This enables the purchasing desires of modern consumers pursuing uniqueness and a variety of designs to be sufficiently satisfied, such that the compatibility of the plastic card of this invention can be greatly raised.

What is claimed is:

1. A three-dimensional plastic sheet comprising:
   a convex lens layer formed of a transparent synthetic resin and having an array of identical semi-spherical convex lenses formed on the top surface thereof;
   a transparent plate disposed at the bottom surface of the convex lens layer and formed of a synthetic resin plate having a thickness corresponding to a focal distance of each convex lens;
   a non-focal distance printed layer disposed on the top surface of the transparent plate by means of offset printing for providing a real picture screen thereon; and
   a focal distance printed layer disposed on the bottom surface of the transparent plate by means of the offset printing for providing a three-dimensional screen thereon through four-color dot printing computed and image-segmented by a computer graphic process,
   wherein the convex lens layer is bonded to the transparent plate with the non-focal distance printed layer and the focal distance printed layer disposed at the top and bottom surfaces thereof.

2. The three-dimensional plastic sheet according to claim 1, wherein a generally flat viewing window is partially formed on the convex lens layer, and the non-focal distance printed layer is partially formed on the focal distance printed layer in such a manner as to be disposed just below the viewing window.

3. The three-dimensional plastic sheet according to claim 1, wherein instead of the focal distance printed layer, an array of embossing patterns is formed on the bottom surface of the transparent plate, and a plurality of grooves that are formed between the respective embossing patterns are disposed at the focal positions of the respective convex lenses.

4. The three-dimensional plastic sheet according to claim 1, wherein the inclined angles of four-color (C,M,Y,K) dots processed by means of offset printing are set to be different from one another in accordance with the density of the convex lenses arranged on the convex lens layer, for minimizing the generation of moire patterns or dizzy illusion on the printed screen.

* * * * *